United States Patent
Lau et al.

(10) Patent No.: US 9,240,960 B2
(45) Date of Patent: Jan. 19, 2016

(54) PORT SCHEDULING FOR A NETWORK DEVICE

(75) Inventors: Michael Lau, Rockville, MD (US); Nathan Shumway Hill, Milpitas, CA (US)

(73) Assignee: Broadcom Corporation, Irvine, CA (US)

( * ) Notice: Subject to any disclaimer, the term of this patent is extended or adjusted under 35 U.S.C. 154(b) by 300 days.

(21) Appl. No.: 13/564,985

(22) Filed: Aug. 2, 2012

(65) Prior Publication Data

US 2014/0025817 A1 Jan. 23, 2014

Related U.S. Application Data

(60) Provisional application No. 61/673,405, filed on Jul. 19, 2012.

(51) Int. Cl.
| | |
|---|---|
| *G06F 15/173* | (2006.01) |
| *G06F 15/16* | (2006.01) |
| *H04L 12/937* | (2013.01) |
| *H04L 12/935* | (2013.01) |

(52) U.S. Cl.
CPC .............. *H04L 49/254* (2013.01); *H04L 49/30* (2013.01)

(58) Field of Classification Search
CPC ..... H04L 41/5025; H04L 63/10; H04L 45/44; H04L 67/14; H04W 28/02; H04W 28/00; G06F 3/061; G06F 9/505; H04J 3/0673
USPC ......... 709/224, 225, 230–233, 223, 226, 227, 709/228, 229, 234
See application file for complete search history.

(56) References Cited

U.S. PATENT DOCUMENTS

| | | | | |
|---|---|---|---|---|
| 6,393,459 | B1* | 5/2002 | Lurndal | 709/203 |
| 2003/0204597 | A1* | 10/2003 | Arakawa et al. | 709/226 |
| 2004/0010612 | A1* | 1/2004 | Pandya | 709/230 |
| 2011/0252166 | A1* | 10/2011 | Padala et al. | 710/74 |

\* cited by examiner

*Primary Examiner* — Edward Kim

(74) *Attorney, Agent, or Firm* — Brinks Gilson & Lione

(57) ABSTRACT

A method and network device provides port scheduling for data ports in the network device. The network device may assign data ports of the network device into port groups according to port characteristics of the data ports. The network device may schedule processing time slots for active data ports by determining a selected port group based on group selection parameters. The network device may then determine a selected data port from the selected port group using port selection criteria. The port selection criteria may maintain minimum and maximum packet spacing requirements for the data ports of a port group. The network device may also maintain an active ports list to disqualify inactive data ports from selection.

17 Claims, 8 Drawing Sheets

| Cycle | Group 0 Active Ports | Group 1 Active Ports | Group 2 Active Ports | Group 0 Weight | Group 1 Weight | Group 2 Weight | Group Selected | Group 0 Credit After Selection | Group 1 Credit After Selection | Group 2 Credit After Selection |
|---|---|---|---|---|---|---|---|---|---|---|
| 0 | 48 | 4 | 1 | 48 | 16 | 10 | - | 0 | 0 | 0 |
| 1 | 48 | 4 | 1 | 48 | 16 | 10 | 0 | 26 | -16 | -10 |
| 2 | 48 | 4 | 1 | 48 | 16 | 10 | 1 | -22 | 42 | -20 |
| 3 | 48 | 4 | 1 | 48 | 16 | 10 | 0 | 4 | 26 | -30 |
| 4 | 48 | 4 | 1 | 48 | 16 | 10 | 2 | -44 | 10 | 34 |
| 5 | 48 | 4 | 1 | 48 | 16 | 10 | 0 | -18 | -6 | 24 |
| 6 | 48 | 4 | 1 | 48 | 16 | 10 | 0 | 8 | -22 | 14 |
| 7 | 48 | 4 | 1 | 48 | 16 | 10 | 1 | -40 | 36 | 4 |
| 8 | 48 | 4 | 1 | 48 | 16 | 10 | 0 | -14 | 20 | -6 |
| 9 | 48 | 2 | 1 | 48 | 8 | 10 | 0 | 4 | 12 | -16 |
| 10 | 48 | 2 | 2 | 48 | 8 | 10 | 2 | -44 | 4 | 40 |
| 11 | 48 | 2 | 2 | 48 | 8 | 10 | 0 | -26 | -4 | 30 |
| 12 | 48 | 2 | 2 | 48 | 8 | 20 | 1 | 2 | -12 | 10 |
| 13 | 48 | 2 | 2 | 48 | 8 | 20 | 0 | -46 | 56 | -10 |
| 14 | 16 | 2 | 2 | 16 | 8 | 20 | 0 | -18 | 48 | -30 |
| 15 | 16 | 2 | 2 | 16 | 8 | 20 | 2 | -34 | 40 | -6 |
| 16 | 16 | 0 | 2 | 16 | 0 | 20 | 0 | -14 | 40 | -26 |
| 17 | 8 | 0 | 2 | 8 | 0 | 20 | 0 | -30 | 40 | -10 |
| 18 | 8 | 0 | 2 | 8 | 0 | 20 | 0 | -20 | 40 | -30 |
| 19 | 8 | 1 | 2 | 8 | 4 | 20 | 2 | -28 | 36 | -18 |
| 20 | 8 | 1 | 2 | 8 | 4 | 20 | 0 | -4 | 32 | -38 |
| 21 | 8 | 1 | 2 | 8 | 4 | 20 | 2 | -12 | 28 | -26 |

Figure 4

PORT SCHEDULING FOR A NETWORK DEVICE

CROSS REFERENCE TO RELATED APPLICATIONS

This application claims the benefit of priority to the following U.S. Provisional Application Ser. No. 61/673,405, entitled "Port Scheduling For A Network Device," filed on Jul. 19, 2012, the contents of which are hereby incorporated herein by reference in its entirety.

TECHNICAL FIELD

This disclosure relates to network devices such as switches. More specifically, this disclosure relates to port scheduling in a network device.

BACKGROUND

Rapid advances in electronics and communication technologies, driven by immense user demand, have resulted in vast interconnected networks of computing devices capable of exchanging immense amounts of data. For example, Local Area Networks (LANs) may connect hundreds or thousands of computing devices in a single network. Perhaps the best known example of such interconnection of computing devices is the Internet, which continues to expand with each passing day. As technology continues to advance and interconnected computer networks grow in size and frequency of use, there is an increasing incentive to send and receive data more efficiently.

BRIEF DESCRIPTION OF THE DRAWINGS

The innovation may be better understood with reference to the following drawings and description. In the figures, like reference numerals designate corresponding parts throughout the different views.

FIG. 4 shows a group selection example.

DETAILED DESCRIPTION

Figure 1:
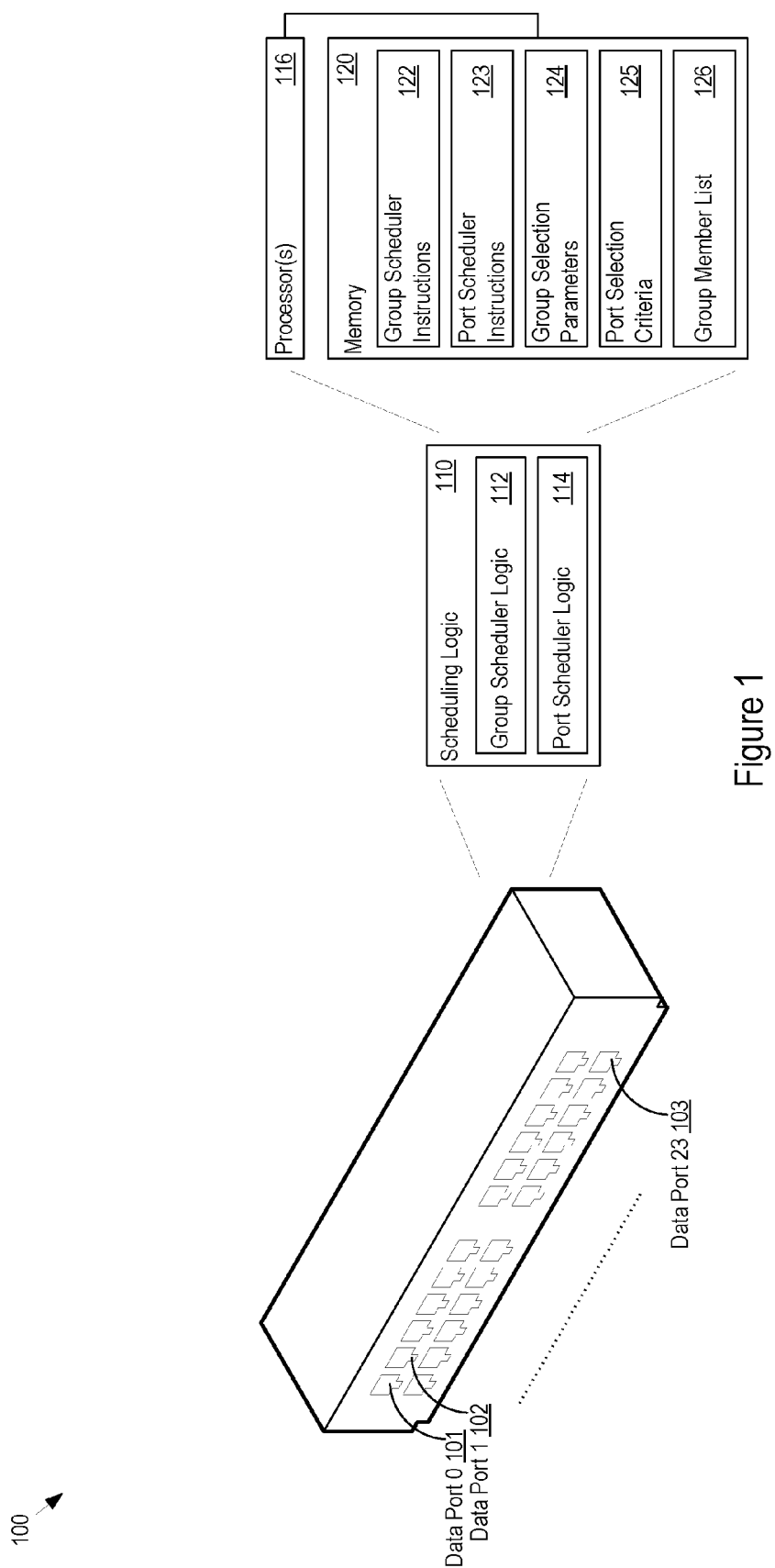
FIG. 1 shows an example of a network device with port scheduling.

FIG. 1 shows an example of a network device 100 with port scheduling. The network device 100 may be a network device capable of communicating data according to any number of communication protocols, such as Ethernet, Digital Subscriber Line (DSL), Integrated Services Digital Network (ISDN), Fiber Distributed Data Interface (FDDI), and other protocols. As examples, the network device 100 may be a switch, hub, router, gateway, network bridge, or any other type of network device that processes or routes network data such as packets.

The network device 100 may include any number of data ports. Each data port may receive or transmit data across any number of networks according to any number of communication protocols, e.g., the communication protocols listed above. As depicted in FIG. 1, the network device 100 contains 24 data ports, three of which are labeled Data Port 0 101, Data Port 1 102, and Data Port 23 103.

A data port may be characterized by any number of port characteristics. Port characteristics may include, for example, communication protocols supported by the data port, port speed, line rate, port number, or other port characteristics. Also, a data port may be identified as active or inactive based on activity criteria. Activity criteria may include, for example, whether any traffic flows are currently flowing into the data port, out of the data port, or both. For example, a data port may be identified as inactive when there are no packets enqueued in the network device 100 that are destined for that data port or when any number of queues storing packets to be sent by data port are empty. As another example, the data port may be identified as active when a queue storing data received by the data port or storing data to be sent by the data port is not empty.

The network device 100 shown in FIG. 1 also includes scheduling logic 110 that may control the scheduling of packet processing in the network device 100, such as packet processing on a receive datapath, on a transmit datapath, or switching the packets from input ports to output ports. The scheduling logic 110 may include the group scheduler logic 112 and the port scheduler logic 114. In one implementation, the scheduling logic 110 includes one or more processors 116 and a memory 120. The memory 120 stores group scheduler instructions 122 and port scheduler instructions 123 that the processor 116 executes. The memory 120 may also store group selection parameters 124, port selection criteria 125, and a group member list 126. The scheduling logic 110, e.g., the group scheduler instructions 122, the port scheduler instructions 123, the group selection parameters 124, the port selection criteria 125, and the group member list 126 to schedule packet processing for any number of data ports of the network device 100.

The network device 100 may perform packet processing according to a time-domain-multiplexed (TDM) technique. The scheduling logic 110 thereby determines when data packets will flow from input ports to an output ports. In one implementation, the scheduling logic 110 may determine a selected data port for each available time slot for packet processing resources in the network device 100, e.g., a packet processing pipeline in a transmit datapath. For example, the packet processing resource may be implemented as digital signal processing (DSP) resource, e.g., a pipeline, shared among the data ports of the network device 100. The packet processing resource for a transmit datapath may process the packet in various manners, such as updating a packet header depending on a communication protocol used by a data port sending the packet, updating virtual local area network (VLAN) information in the packet header, or more. Alternatively, the scheduling logic 110 may determine a selected data port for each available time slot during which a packet may move from an input port to an output port across a switching fabric that connects the ports to one another.

In one embodiment, the total bandwidth of data ports (active or inactive) assigned to a packet processing resource (e.g., a DSP pipeline) is greater than the maximum bandwidth the packet processing resource can support. For example, the scheduling logic 110 may allocate 12 of the data ports in the network device 100 with a total maximum bandwidth of 200 Gigabits/second (Gbs) to a first packet processing resource with a maximum processing bandwidth of 100 Gbs. This allocation may be referred to as oversubscribing the packet processing resource or oversubscribed bandwidth. The scheduling logic 110 may schedule processing time slots of the oversubscribed packet processing resource based on the active/inactive state of data ports in the network device 100. When not all of the data ports are active, the scheduling logic 110 may only select the active data ports, which may maintain port bandwidth on the active data ports. When all of the data ports assigned to the oversubscribed packet processing resource are active, the scheduling logic 110 may service each of the data ports by scheduling processing time slots for each of the data ports, during which the line rate of the data port is fully maintained. However, since the packet processing resource is oversubscribed, each data port may operate at an overall bandwidth below its maximum capacity because a greater time may elapse between selections of the data port by the scheduling logic 110.

As part of the data port scheduling process, the scheduling logic 110 may group data ports of the network device 100 into any number of port groups. The scheduling logic 110 may assign a data port to a particular port group based on any number of port characteristics of the data port. As one example, the scheduling logic 110 may group data ports with the same port speed into the same port group. In FIG. 1, data port 0 101 and data port 1 102 may each be 10 Gigabit (Gb) Ethernet data ports while data port 23 103 may be a 40 Gb Ethernet data port. The scheduling logic 110 may assign data port 0 101 and data port 1 102 to a first port group and data port 23 103 to a second port group. The first port group may include other 10 Gb data ports and the second port group may include other 40 Gb data ports. As another example, the scheduling logic 110 may assign data ports with similar packet spacing requirements to the same port group. The scheduling logic 110 may also assign data ports that share physical resources to the same port group. For example, the scheduling logic 110 may assign data ports using the same multi-lane Serializer/Deserializer (SerDes) resource to the same port group.

A port group may contain any number of data ports. In one implementation, the scheduling logic 110 may limit the size of a port group to a maximum group size. Once the membership of a port group reaches the maximum group size, the scheduling logic 110 may assign data ports with similar port characteristics, e.g., port speed, to a different port group. Thus, the network device 100 may include multiple port groups containing data ports that share similar port characteristics, for example multiple port groups including 10 Gb data ports. The scheduling logic 110 may also update a port group, for example by adding or removing a data port from the port group. In one implementation, the scheduling logic 110 may add or remove a data port from the port group when the data port is inactive, e.g., when there are no packets enqueued in the network device 100 that are destined for that data port.

The scheduling logic 110 may track group membership of port groups in the device through the group member list 126. The group member list 126 may be implemented in any number of ways, such as a table stored in the memory 120 or as a register array. The group member list 126 may include a group membership listing for each port group in the network device 100. The group member list 126 may store any type of port identifying information for each listed data port such as a port index, a port number, or a physical port ID. Other implementations may include additional or less port identifying information.

As will be described in more detailed below, the scheduling logic 110 may schedule processing time slots for active data ports of the network device 100 in two phases. First, the group scheduler logic 112 may determine a selected port group from among port groups in the network device 100. Second, the port scheduler logic 114 may determine a selected data port within the selected port group to allocate a processing time slot.

Figure 2:
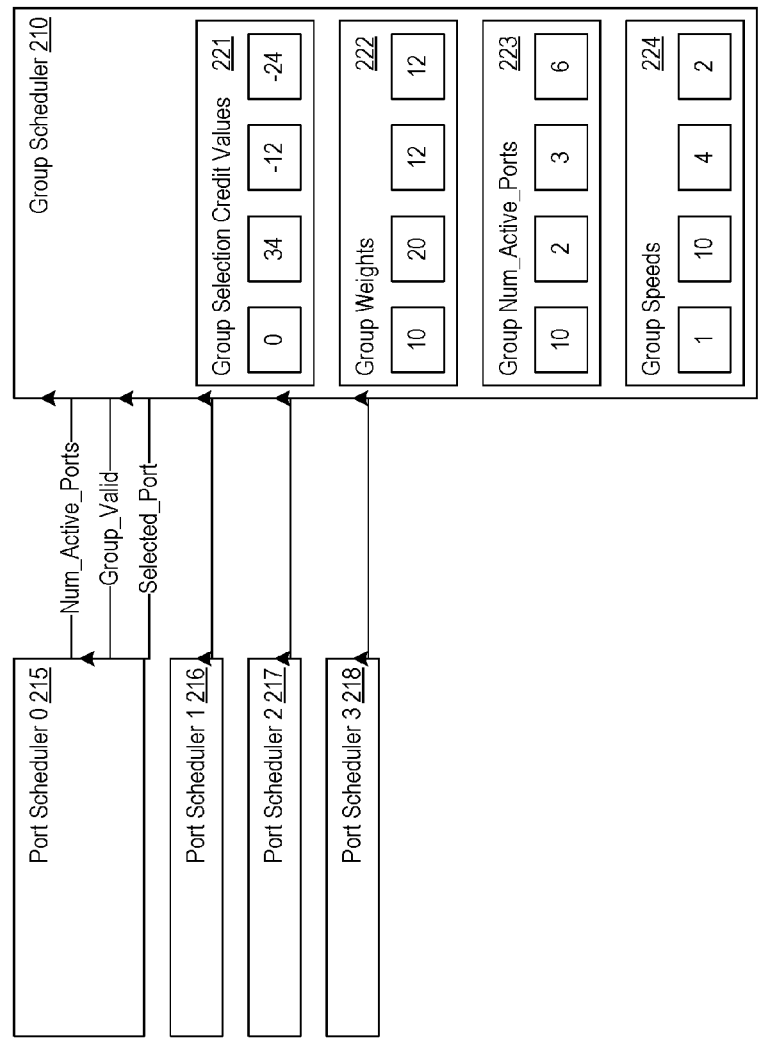
FIG. 2 shows an example of interaction between a port scheduler and a group scheduler.

FIG. 2 shows an example 200 of interaction between a port scheduler and a group scheduler. The example 200 shown in FIG. 2 includes a group scheduler 210. The group scheduler 210 may be implemented as software, hardware, or both. For example, the group scheduler 210 may be implemented as the group scheduler logic 112 and may include the group scheduler instructions 122 and the group selection parameters 124. The group scheduler 210 may communicate with any number of port schedulers. As seen in FIG. 2, the group scheduler 210 is communicatively coupled to four port schedulers labeled as port scheduler 0 215, port scheduler 1 216, port scheduler 2 217, and port scheduler 3 218. Each port scheduler may be associated with a port group in the network device 100. For instance, the network device 100 may include four port groups identified as port groups 0-3. In FIG. 2, port scheduler 0 215 may be associated with port group 0, port scheduler 1 216 may be associated with port group 1, port scheduler 2 217 may be associated with port group 2, and port scheduler 3 218 may be associated port group 3. Port schedulers are discussed in greater detail in FIG. 5 below.

The group scheduler 210 may maintain various group selection parameters to determine a selected port group. For example, the group scheduler 210 shown in FIG. 2 maintains group selection credit values 221, group weight parameters 222, group active ports parameters 223, and group speed parameters 224. The group scheduler 210 may store these group selection parameters in any number of ways, such as through a memory or through any number of register arrays.

Each group selection parameter value of the group selection parameters 221-224 may be associated with a port group of the network device 100. In FIG. 2, the group scheduler 210 stores four parameter values for each group selection parameter 221-224. Each of the four stored parameter values may be associated with a respective port group, for example based on the position of the parameter value in the memory or register array. In FIG. 2, the leftmost group selection credit value with a value of 0 may be associated with port group 0 of the device. The next group selection credit value with a value of 34 may be associated with port group 1 of the network device 100. The third group selection credit value with a value of −12 may be associated with port group 2 of the network device 100 and the rightmost fourth group selection credit value with a value of −24 may be associated with port group 3 of the network device 100. In a similar fashion, the respective parameter values for the group weight parameters 222, the group active ports parameters 223, and the group speed parameters 224 may be associated with a port group 0-3 of the network device 100.

The group scheduler 210 may maintain the group selection parameters to balance selection of port groups. The active ports parameters 223 may provide an indication of the number of ports in a port group that are active, as reported to the group scheduler 210 by any of the port schedulers 215-218. The higher the active ports parameter value of a port group, the more processing time slots the port group may require to ensure data ports in the port group can comply with minimum port bandwidth requirements or maximum packet spacing requirements.

The group speed parameters 224 may indicate the port speed of data ports in a particular port group. Alternatively, the group speed parameters 224 may indicate the port speed of data ports in a port group relative to other port groups. For example, a port group including 1 Gb data ports may have a group speed parameter value of 1 and a port group including 4 Gb data ports may have a group speed parameter value of 4. In the same example, a port group including X Gb data ports may have a group speed parameter value of X. The greater the port speed parameter value of a port group, the more processing time the port group, and data ports within the port group, may require to maintain bandwidth or spacing requirements.

The group weight parameter values 222 may indicate a relative proportion of processing time slots a port group requires. The group weight parameter values 222 may be determined based on any number of other group selection parameters. For example, in FIG. 2, the group scheduler 210 calculates group weight parameter values 222 as the product of the active ports parameter 223 and the group speed parameter 224 (e.g., active port parameter value×group speed parameter value). As seen in FIG. 2, port group 0 has a calculated group weight value of 10, which is the product of the active ports parameter value for port group 0 (parameter value of 10) and the group speed parameter value of port group 0 (parameter value of 1).

The group selection credit values 221 are discussed in greater detail below and may incorporate a relative proportion of processing time slots a port group may require as well as the selection history of the port group.

In operation, the group scheduler 210 may determine a selected port group from among any number of port groups in the network device 100 to allocate a processing time slot. The group scheduler 210 may use any number of group selection parameters to determine the selected port group. For example, the group scheduler 210 may determine a selected port group by determining which of the group selection credit values 221 meets a selection criteria. The selection criteria may be the lowest group selection credit value, the highest group selection credit value, or any other criteria based on the group selection credit value. In FIG. 2, the group scheduler 210 may determine that the selection credit value of −24 associated with port group 3 meets the selection criteria of lowest group selection credit value. Consequently, the group scheduler 210 may identify port group 3 as the selected port group.

When the selection credit value of multiple port groups meet the selection criteria, the port scheduler 210 may determine the selected port group by comparing any number of additional group selection parameters. For example, the group scheduler 210 may compare the respective group weight parameter values 222, the active ports parameter values 223, or the group speed parameter values 224 of the multiple port groups that meet the selection criteria. In one implementation, when the group selection credit values of multiple port groups meet the selection criteria, the port scheduler 210 may identify the port group from the multiple port groups with highest group weight parameter value as the selected port group.

Upon determining a selected port group, the group scheduler 210 may send a group selection parameter, such as the group_valid signal, to each of the port schedulers 215-218. The group selection parameter may indicate the selected port group. For example, the group scheduler 210 may send a group_valid signal having a value of 1 to the port scheduler associated with the selected port group and a group_valid signal having a value of 0 to the other port schedulers. The group scheduler 210 may then receive a selected port parameter, such as the selected_port signal, from the port scheduler associated with the selected port group. The selected port parameter may identify a selected data port determined by the port scheduler.

Upon determining a selected port group, the group scheduler 210 may also update the selection credit values 221 for the port groups. The group scheduler 210 may adjust the selection credit value for the selected port group against consecutive selection, for example by determining an adjustment value for the selected port group. The group scheduler 210 may determine the adjustment value as a function of any number of the group weights 222. Further, the group scheduler may apply the adjustment value based on the selection criteria. For example, when the selection criteria includes the lowest selection credit value of the port groups, the group scheduler 210 may increase the selection credit value of the selected port group by the adjustment value to adjust against consecutive selection. In one implementation, the group scheduler 210 calculates the adjustment value of the selected port group as the sum of the group weights of port groups other than the selected port group.

The group scheduler 210 may also update the selection credit values for port groups other than the selected port group, e.g., non-selected port groups. The group scheduler 210 may adjust the selection credit value for non-selected port groups toward subsequent selection, for example by determining an adjustment value for any number of the non-selected port groups. In one implementation, the group scheduler 210 calculates the adjustment value of a non-selected port group as a function of the group weights 222. For example, the group scheduler 210 may calculate the adjustment value of a non-selected port group as the group weight parameter value of the non-selected port group and apply the adjustment value to the non-selected port group accordingly.

The group scheduler 210 may update the group selection credit values 221 adjust selection credit values based on the group weight parameters 222 and based on whether a port group was selected or not. Thus, the selection credit value of a port group may reflect the relative proportional amount of processing time slots required by the port group (e.g., the group weight) and the selection history of the port group (e.g., adjustment varies depending on whether the port group was selected or not). In this way, the group scheduler 210 may balance selection of port groups for processing by packet processing resources of the network device 100, such as an oversubscribed packet processing pipeline.

Figure 3:
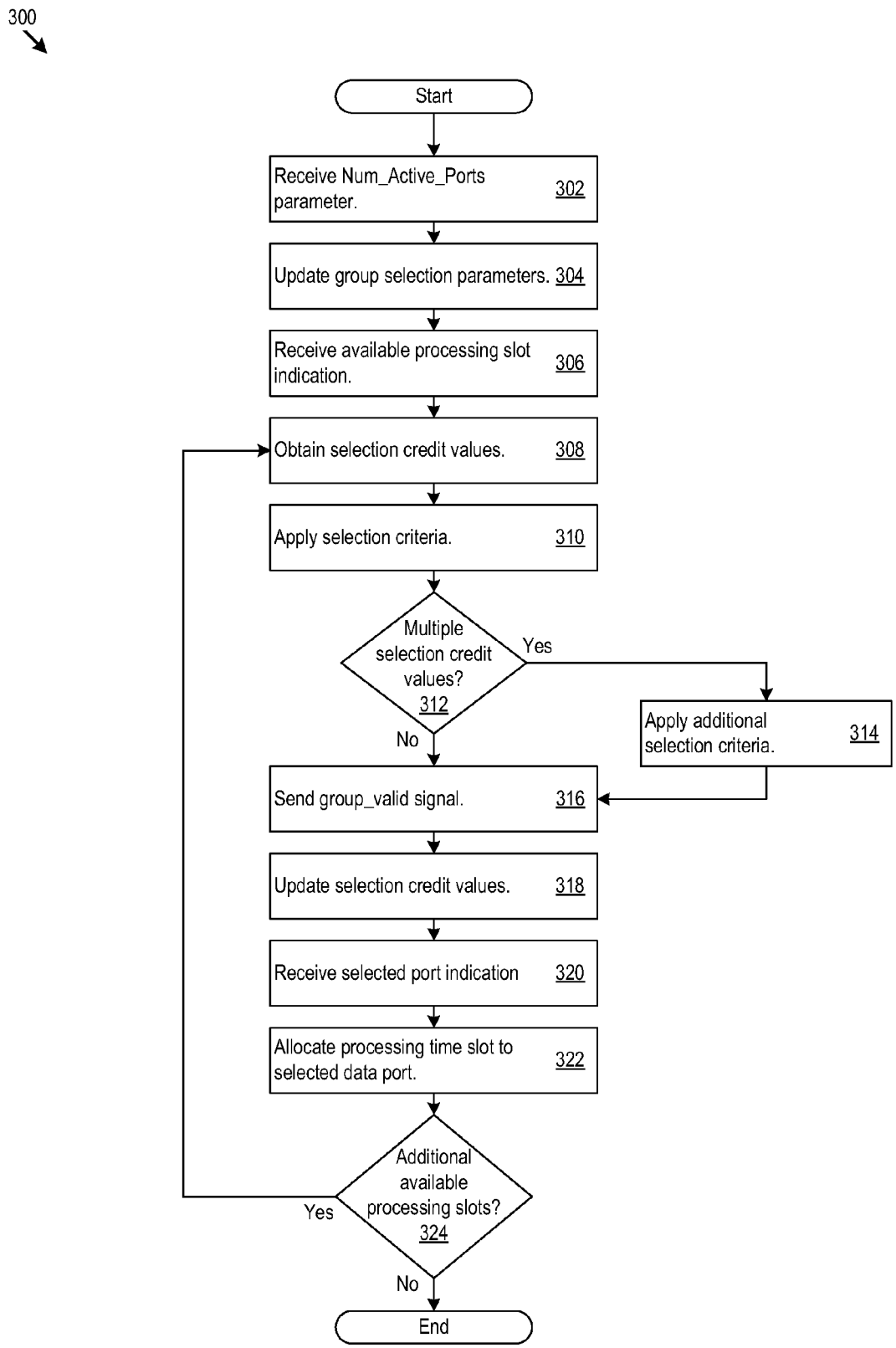
FIG. 3 shows an example of logic that the network device may implement as hardware, software, or both.

FIG. 3 shows an example of logic 300 that the network device 100 may implement as hardware, software, or both. For example, the network device 100 may implement the logic 300 as part of the scheduling logic 110, such as the group scheduler logic 112. The group scheduler logic 112 may receive an active ports parameter value from a port scheduler at any time (302). The group scheduler logic 112 may then update the active ports parameters 223 (304). The group scheduler logic 112 may also receive an available processing slot indication (306) indicating an available time slot, e.g., a processing time slot, for packet processing resources of the network device 100 to process one or more packets to be transmitted by the data port of the network device 100. In one implementation, the group scheduler logic 112 may receive the available processing slot indication from the scheduling logic 110.

The group scheduling logic 112 may determine a selected port group from among the port groups by obtaining selection credit values for port groups of the network device 100 (308). For example, the group scheduling logic 112 may read the group selection credit values 221 from a memory or a register array. The group scheduling logic 112 may then determine which of the selection credit values meets a selection criteria (310). In one implementation, the group scheduling logic 112 may determine the lowest selection credit value of the group selection credit values 221. When multiple group selection credit values meet the selection criteria (312), the group scheduling logic may determine selected port group from among the multiple port groups by using additional selection criteria (314). For example, the group selection logic 112 may determine which of the multiple port groups with group selection credit values has the highest or lowest group weight value, the highest or lowest active ports parameter value, the highest or lowest group speed value, or any combination thereof.

Upon determining the selected port group, the group scheduling logic 112 may send the group_valid signal to the port schedulers (316) indicating which port group the processing time slot has been allocated to. The group scheduling logic 112 may also update the selection credit values of the selected port group and other port groups (318), for example as described above. Further, the group scheduling logic 112 may receive a selected port parameter from a port scheduler associated with the selected port group (320). The selected port parameter may include any amount of port identifying data, such as a port number or a physical port ID. The group scheduling logic 112 may then allocate the processing time slot to the data port identified by the selected port indication (322). For example, the group scheduling logic 112 may send a slot allocation indication to logic associated with a packet processing resource or to the scheduling logic 110 identifying the selected data port. The group scheduling logic 112 may continue to determine a selected port group for each available processing slot indication received by the group scheduling logic 112 (324).

FIG. 4 shows a group selection example 400. The group selection example 400 shown in FIG. 4 depicts group selections for a device 100 configured with 48 10 Gb data ports assigned to port group 0, 4 40 Gb data ports assigned to port group 1, and 2 100 Gb data ports assigned to port group 2. The scheduling logic 110 may assign an initial selection credit value of 0 to each of the port groups, as seen in cycle 0. The group scheduling logic 112 may use the lowest selection credit value as selection criteria and the highest group weight as additional selection criteria.

As seen in cycle 1 of the group selection example 400, the group scheduling logic 112 may determine that each of the three port groups meets the selection criteria as each of the port groups has the lowest selection credit value, (i.e., 0). The group scheduling logic 112 may apply the additional selection criteria to select the port group with the highest group weight—in this case, port group 0 with a group weight of 48. After determining a selected port group, the scheduling logic 112 may update the selection credit values of each of the port groups. The group scheduling logic 112 may increase the selection credit value of the selected port group, port group 1, by the sum of the weights of the non-selected port groups, port groups 0 and 2. The group scheduling logic 112 may also decrease the selection credit value of port groups 0 and 2 by their respective group weights. Similar selection credit value updates can be seen in each of the group selection cycles shown in FIG. 4.

Also as shown in FIG. 4, the number of active ports in a port group may vary at different points in time, e.g., at different group selection cycles. This fluctuation in active port number may affect the group weight as well as selection credit value adjustments to the port group. For example, at cycle 9, the active ports parameter value reported by port group 1 drops from a value of 4 to a value of 2. Consequently, the group weight of port group 1 drops from 16 to 8. Similarly, when updating the selection credit value of port group 1, the adjustment value determined by the group scheduler logic 112 drops from a value of 16 in cycle 8 to a value of 8 in cycle 9. In other words, changes in the number of active ports in a port group may affect the group selection frequency and allocation of processing time slots to the port group. Similar effects on the group weight, adjustment value, and group selection frequency may be observed at cycles 14 and 18 for port group 0, cycles 16 and 19 for port group 1, and at cycle 12 for port group 2.

Figure 5:
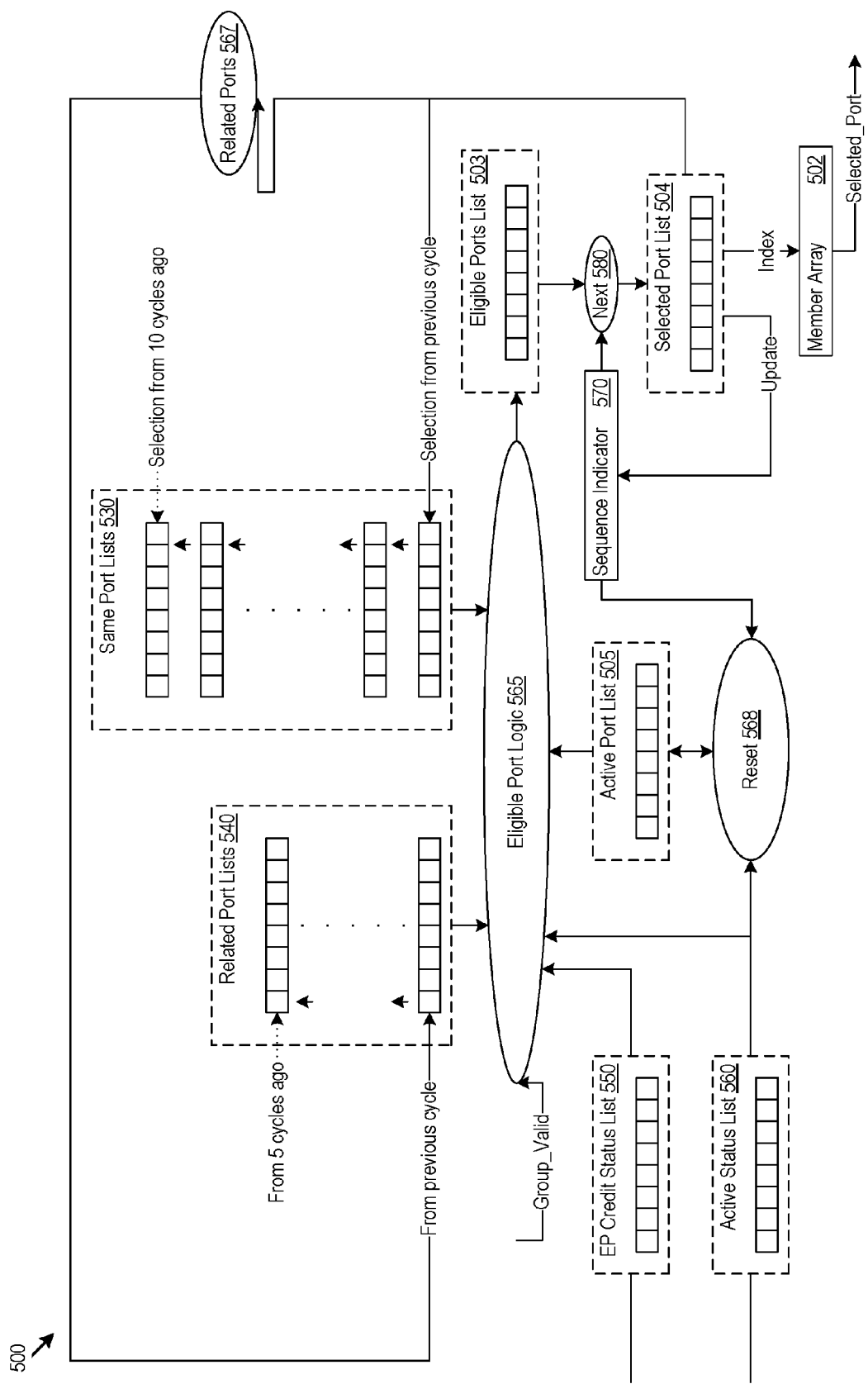
FIG. 5 shows an example of a port scheduler.

After the group scheduling logic 112 determines a selected port group, a port scheduler may determine a selected data port from the selected port group. FIG. 5 shows an example of a port scheduler 500. The port scheduler 500 may be implemented as software, hardware, or both. For example, the port scheduler 500 may be implemented as the port scheduler logic 114 and may include the port scheduler instructions 123 and the port selection criteria 125. The port scheduler 500 may be associated with a port group of the network device 100

The port scheduler 500 may maintain a listing of data port members of the associated port group. As shown in FIG. 5, the port scheduler 500 includes a member array 502. Each entry of the member array 502 may identify a data port in the port group and store port identifying data. For example, an entry of the member array 502 may store a port number, a physical port ID, a port index, or more. The port index may specify a position of a port list used by the port scheduler 500 when determining a selected data port. Port lists may include the eligible ports list 503, the selected port list 504, the active port list 505, the same port lists 530, the related port lists 540, the Egress Port (EP) credit status list 550, and the active status list 560 shown in FIG. 5. In one implementation, the port lists may be implemented as bit maps and port indexes may identify a bit map location where storing data concerning a particular data port of the port group.

The port scheduler 500 may determine a selected data port in any number of ways. In one implementation, the port scheduler 500 may select data ports from the port group in accordance with a round robin technique. Each cycle, the port scheduler 500 may indicate the selected data port using the selected port list 504, which may be a bit map with a value of 1 at the port index of the selected data port and a value of 0 at other index locations. The selected port list 504 may also indicate if no data port was selected in the cycle, for example when all the bits of the selected port list 504 have a value of 0. Using the selected port list 504, the port scheduler 500 may obtain port identifying information of a selected data port using the member array 502. For example, the port scheduler 500 may use the port index of the selected data port as an index to locate a corresponding entry in the memory array 502. The port scheduler 500 may then send a selected_port signal to a group scheduler 210 identifying the selected data port.

In determining the selected data port, the port scheduler 500 may employ any number of port selection criteria 125. The port selection criteria 125 may filter which data ports of the port group are eligible for selection during any given selection cycle or port selection round. As shown in FIG. 5, the port scheduler logic 500 determines the selected data port using the eligible port logic 565. The eligible port logic 565 may take various types of data as inputs, including port selection criteria, and generate an eligible ports list 503. The eligible port logic 565 may generate the eligible ports list 503 each cycle. The eligible ports list 503 may indicate which data ports of the port group are eligible for selection by the port scheduler 500 during the cycle.

The port selection criteria 125 may include the active port list 505, which may identify which data ports were active at the start of the current port selection round. In one implementation, the port scheduler 500 may identify active data ports at the start of the port selection round as eligible for selection. At the start of the port selection round, the reset logic 568 may generate the active port list 505 based on data port status information, such as the active status list 560. The active status list 560 may include data port status information that identifies whether data ports in the port group are currently active or inactive. The port scheduler 500 may receive the active status list 560 from additional logic that tracks the current active/inactive status of data ports in the network device 100. In one implementation, the port scheduler 500 may receive data port status information indicating and generate the active status list 560 in the form of a bit map, in part by referencing the member array 502 for port index information. The eligible port logic 565 may receive the active port list 505 as an input when determining eligible ports in a current cycle.

The port scheduler 500 may also employ port selection criteria 125 to maintain maximum or minimum packet spacing requirements of data ports in the network device 100. The port scheduler 500 may determine a data port is ineligible for selection in a cycle if the data port was selected too recently. For example, the port scheduler may determine if the data port violates a same port frequency threshold parameter, which may represent a number of cycles. In FIG. 5, the same port frequency threshold parameter may have a value of 10 and the port scheduler 500 tracks the data ports selected over the previous 10 cycles through the same port lists 530. In FIG. 5, the same port lists 530 may include the selected port lists 504 from the previous 10 cycles. The same port lists 530 may include the selected port lists 504 from any number of previous cycles, and may be configured according to the same port frequency threshold parameter.

The port scheduler 500 may configure the same port frequency threshold parameter according to any number of spacing requirements. For example, the same port frequency threshold parameter may be stored as a register value that the port scheduler 500 may update depending on spacing requirements. The eligible port logic 565 may receive the same port lists 530 as an input and disqualify from selection any data ports identified in the same port lists 530, e.g., any data ports selected in the previous N cycles as specified by the same port frequency threshold parameter.

The port scheduler 500 may also configure a related port frequency threshold parameter to disqualify data ports for selection when a related data port was too recently selected. In FIG. 5, the related ports logic 567 may receive the selected port list 504 from a cycle and also identify port index (or indices) of any data ports meeting a relation criteria with the selected data port. For example, the related ports logic 567 may alter the selected port list 504 to also mark as selected the bit data at each of the port index (or indices) of any data ports in the same Multi-lane SerDes as the selected data port. The port scheduler 500 may then track the selected data ports as well as related data ports through the related port lists 540, which may store any number of bit lists according to the related port frequency threshold parameter. The eligible port logic 565 may receive the related port lists 540 as an input and disqualify from selection any port identified in the related port lists 540, e.g., selected data ports from the previous M cycles as specified by the related port frequency threshold parameter and ports related to the selected data ports.

The port scheduler 500 may update the same port lists 530 and the related port lists 540 on cycles when no data port is selected by the port scheduler 500. For example, on a cycle when the port group was not selected by the group scheduler, the port scheduler 500 may insert a selected port list 504 that indicates no data port was selected into the same port lists 530 and the related port lists 540.

The port scheduler 500 may also employ additional port selection criteria 125 to determine a selected data port, such as the EP credit status list 550. The EP credit status list may indicate when a data port is ineligible for selection based on a system state or the state, e.g., level of buffering, of an egress data port. For example, the EP credit status list 550 may disqualify a data port for selection during a system speedup process, when a flow control message is received by the network device 100 to temporarily halt transmission of data through the data port, or in various other circumstances. The eligible port logic 565 may receive the current EP credit status list 550, e.g. periodically as an input each cycle. The eligible port logic 565 may disqualify ports identified as ineligible according to the EP credit status list 550. The eligible port logic 565 may also receive the active status list 560 as an input and disqualify data ports identified as inactive according to the active status list 560.

The eligible port logic 565 may receive any number of inputs such as the different various port selection criteria 125 described above. The eligible port logic 565 may generate the eligible ports list 503, which may indicate which data ports are eligible for selection in the current selection cycle. The eligible ports list 503 may also indicate when no data ports are eligible, e.g., when no data ports meet the inputted port selection criteria 125. Also, when the group_valid signal indicates the port group associated with the port scheduler 500 has not been selected in a particular cycle, the eligible port logic 565 may generate an eligible ports list 503 indicating no data ports are eligible in the current cycle, e.g., a bit list with only 0 values.

The port scheduler 500 may determine a selected data port using the eligible ports list 503 and a sequence indicator 570. The sequence indicator 570 may indicate the most recently selected data port in the port group. For example, the sequence indicator 570 may be implemented as a register value storing the port index of the previously selected data port. The next selected port logic 580 may receive the sequence indicator 570 and the eligible ports list 503 and determine a selected data port in any number of ways. For example, the next selected port logic 580 may identify the first eligible data port with a port index greater than the sequence indicator 570. The next selected port logic 580 may generate the selected port list 504 identifying the data port selected in the current cycle. The port scheduler 500 may also update the sequence indicator 570 to identify the data port selected by the next selected port logic 580. As discussed above, the port scheduler 500 may use the selected port list 504 and the member array 502 to send a selected_port signal identifying the selected data port determined by the port scheduler 500.

In some circumstances, the next selected port logic 580 may generate a selected port list 504 that indicates no data port was selected in the current cycle. These circumstances include when the eligible ports list 503 indicates no data ports are eligible during the current selection round, e.g., when the group_valid signal indicates the port group was not selected or when all potentially eligible ports were disqualified according to the port selection criteria 125.

The port scheduler 500 may also reset a selection round according to any number of reset criteria. For example, the reset logic 568 may receive the sequence indicator 570 and the active port list 505. In one implementation, the reset logic 568 may determine when the sequence indicator 570 has reached the highest port index of the active port list 505, signaling the end of a selection round. The reset logic 568 may reset the port selection round by updating the active port list 505 for the new round and resetting the sequence indicator 570.

In an alternative embodiment, the port scheduler 500 may maintain a selected port list, which may identify each data port selected in the current selection round. The reset logic 568 may receive the selected port list and the active status list 560. The reset logic 568 may determine to reset a selection round when each active port identified by the active status list 560 has been previously selected in the current selection round, as identified by the selected port list. In this implementation, the reset logic 568 may reset the round by updating the active port list 505 for the new port selection round, resetting the sequence indicator 570, and clearing the selected port list.

Figure 6:
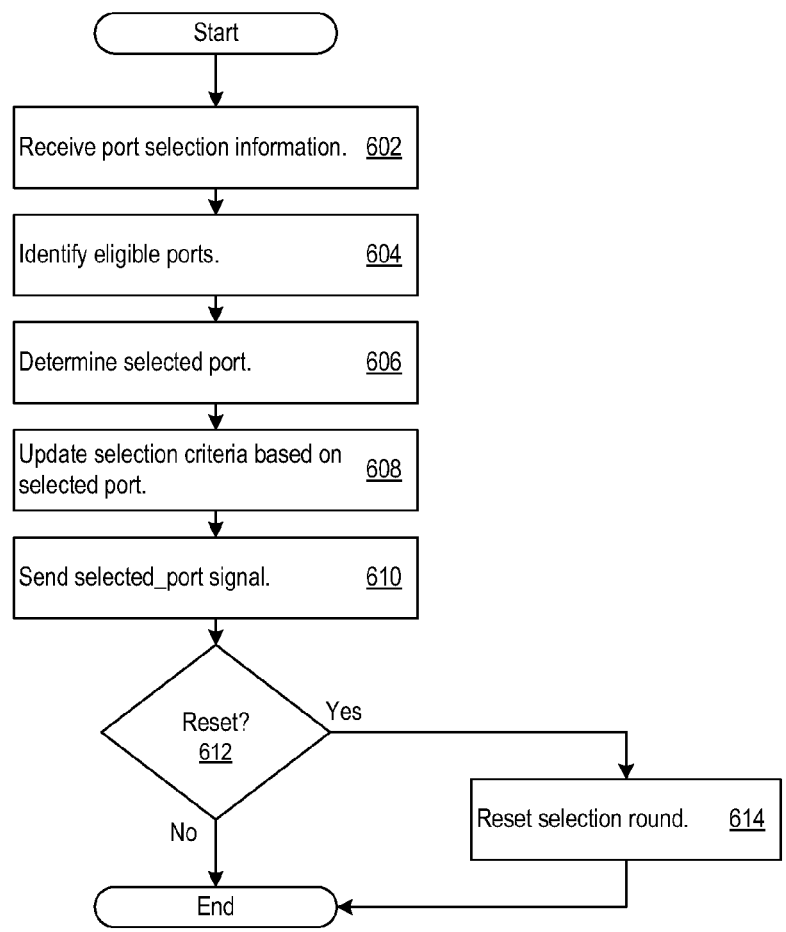
FIG. 6 shows an example of logic that the network device may implement as hardware, software, or both.

FIG. 6 shows an example of logic 600 that the network device 100 may implement as hardware, software, or both. For example, the network device 100 may implement the logic 600 as part of the scheduling logic 110 such as the port scheduler logic 114. The port scheduler logic 114 may receive port selection information (602), such as the group_valid signal, the EP credit status list 550, or the active status list 560. The port scheduler logic 114 may then identify data ports of the port group eligible for selection in the current selection cycle (604). For example, the port scheduler logic 114 may implement the eligible port logic 565 or apply any of the port selection criteria 125 described in FIG. 5 above to determine data ports eligible for selection in the current cycle.

Next, the port scheduler logic 114 may determine a selected data port from the eligible data ports, if any (606). For example, the port scheduler logic 114 may determine a selected data port using a sequence indicator 570 or selected port list to select an eligible data port not previously selected in the current round. The port scheduler logic 114 may then update port selection criteria 125 or any other data to reflect the data port selection (608). For example, the port scheduler logic 114 may update the same port lists 530, the related port lists 540, the sequence indicator 570, or a selected port list. The port scheduler logic 114 may then send a selected_port signal identifying the selected data port (610). The port scheduler logic 114 may also determine if reset criteria are satisfied (612). If so, the port scheduler logic 114 may reset the selection round (614) by, for example, updating the active port list 505, resetting a sequence indicator 570, or clearing a selected port list.

Figure 7:
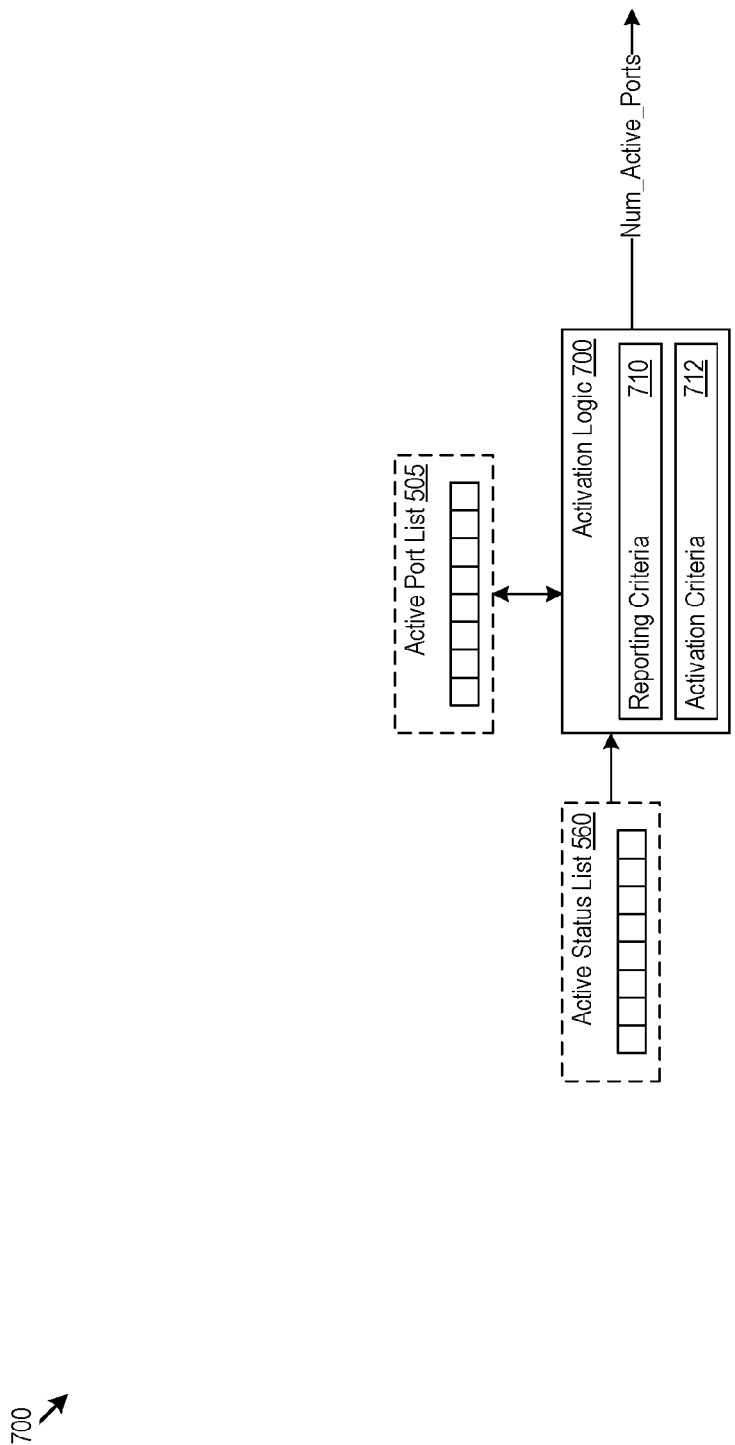
FIG. 7 shows an example of activation logic that may be implemented as part of the port scheduler.

FIG. 7 shows an example of activation logic 700 that may be implemented as part of the port scheduler 500. The activation logic 700 may be implemented as software, hardware, or both. As discussed above concerning FIG. 4, the active ports parameter value of a port group can affect the group weight and selection frequency of a port group. If the active ports parameter value reported by the port scheduler 500 changes during the same cycle that the port scheduler 500 receives an updated active status list 560, spacing requirements may be violated. For example, if the reported active ports parameter value of a port group decreases during a selection round, the group scheduler 210 may decrease the group weight of the port group. As such, the port group may be selected less frequently by the group scheduler 210, thus increasing the time to complete the current selection round of the port group. Data ports in the port group selected prior to the reported decrease in the active ports parameter value may not be selected until the current selection round completes. Thus, the time between selections of these previously selected data ports may increase which may violate the maximum spacing time required to maintain a certain port speed, bandwidth, or overall line rate.

The activation logic 700 may control the timing of when a port scheduler 500 reports an updated active ports parameter value to a group scheduler. The activation logic 700 may determine update timing according to any number of reporting criteria 710, for example reporting criteria 710 to address the spacing requirement scenario described above. The activation logic 700 may receive an indication of the number of active ports in a port group, for example by summing the number of active ports identified in the active status list 560. In one implementation, the activation logic 700 may report an updated active ports parameter at any time upon receiving an indication that the number of active data ports in the port group has increased.

When the activation logic 700 receives an indication that the number of active data ports in the port group has decreased, the activation logic 700 may wait to report an updated active ports parameter value until the reporting criteria 710 is satisfied. For example, the reporting criteria 710 may specify that a an active ports number lower than the currently reported active ports parameter value be maintained for at least an entire selection round before the activation logic 700 can report an updated active ports parameter value. Thus, in one implementation, the activation logic 700 may track the highest number of active ports during a subsequent selection round. If the highest number of active ports during the subsequent selection round is lower than the currently reported active ports parameter value, the activation logic 700 may report this highest number of active ports during the subsequent selection round as the updated active ports parameter value to the group scheduler 210.

The activation logic 700 may also control selection eligibility of data ports that activate, e.g., transition from an inactive state to an active state or deactivate, e.g., transition from an active state to an inactive state. For example, the activation logic 700 may control eligibility of activated and deactivated data ports by updating any number of port selection criteria, such as the active port list 505.

The activation logic 700 may obtain an activation indication that a data port in the port group has activated. The activation logic 700 may also receive a deactivation indication that a data port has deactivated. For example, the activation logic 700 may obtain activation indications and deactivation indications by identifying differences between the active status list 560 and the active port list 505. The activation logic 700 may update the active port list 505 when a data port deactivates during a port selection round to indicate that the data port is ineligible for selection. When a data port activates during the port selection round, the activation logic 500 may wait until the activation criteria 712 is satisfied before updating the active port list 505 to indicate that the data port is eligible for selection. The activation criteria 712 may include, for example, completion of the current port selection round. Alternatively, the activation criteria 712 may include completion of the current port selection round and a subsequent port selection round. In these examples, the activation logic 700 may store any number of data, e.g., lists or bitmaps, tracking which data ports have activated during the current port selection round and await satisfaction of the activation criteria 712.

Figure 8:
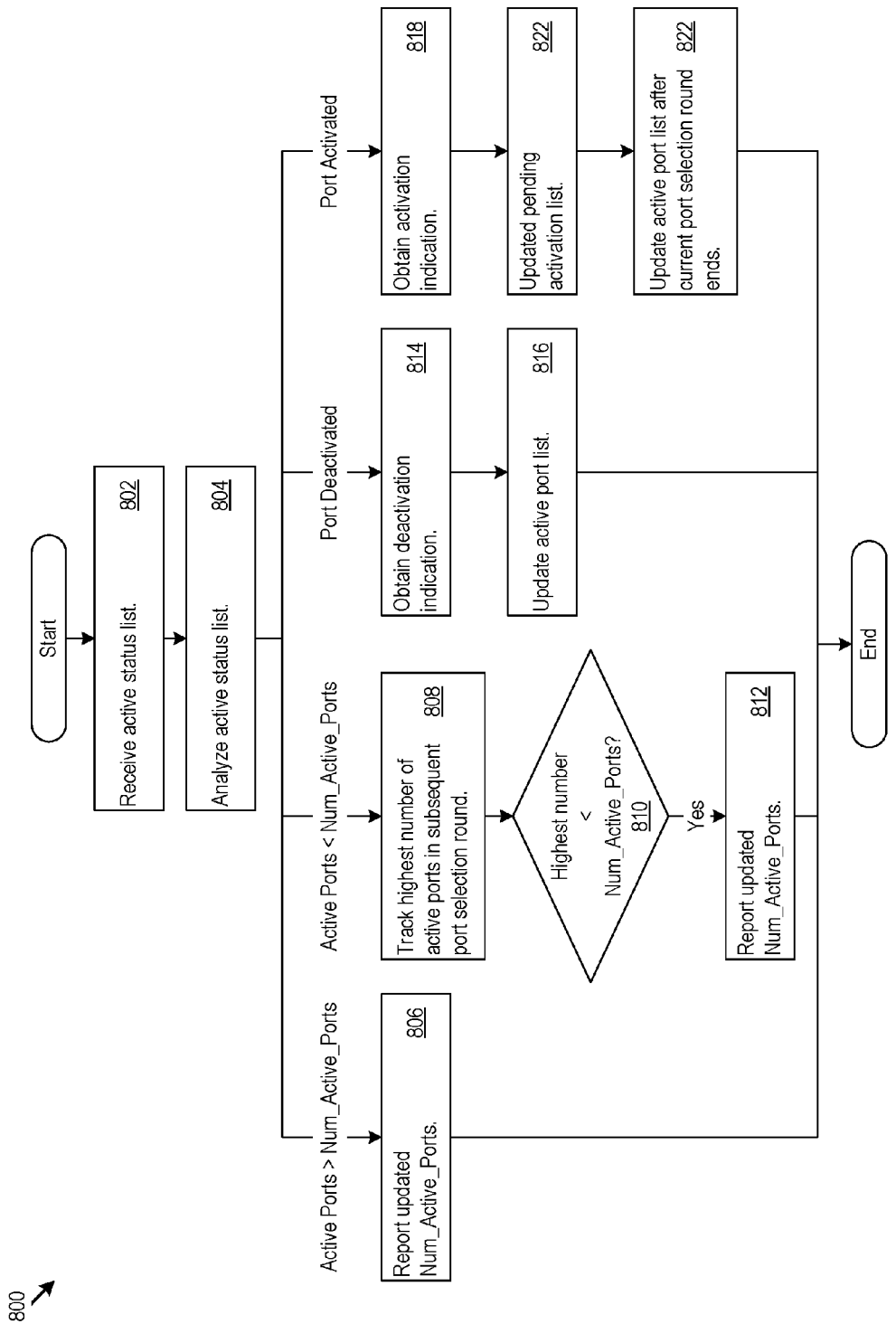
FIG. 8 shows an example of logic that the network device may implement as hardware, software, or both.

FIG. 8 shows an example of logic 800 that the network device 100 may implement as hardware, software, or both. For example, the network device 100 may implement the logic 800 as part of the scheduling logic 110, such as the port scheduler logic 114 or the activation logic 700. The activation logic 700 may receive the active status list 560 indicating which data ports in the port group are active (802). The activation logic 700 may analyze the active status list 560 (804), for example by comparing the active status list 560 to the active port list 505 or the current active ports parameter value currently reported by the activation logic 700.

When the activation logic 700 identifies that the number of active ports specified by the active port list 505 is greater than the currently reported active ports parameter value, the activation logic 700 may update the active ports parameter value to report the increased number of active ports as specified by the active port list 505 (806). When the activation logic 700 identifies that the number of active ports specified by the active port list 505 is less than the currently reported active ports parameter value, the activation logic 700 may track the highest number of active ports during the subsequent selection round (808). If the highest number of active ports during the subsequent selection round is lower than the currently reported active ports parameter value (810), the activation logic 700 may report the highest number of active ports during the subsequent selection round as the updated active ports parameter (812).

When the activation logic 700 obtains a deactivation indication that a data port has deactivated (814), the activation logic 700 may update the active port list 505 (816). When the activation logic 700 obtains an activation indication that a data port has activated (818), the activation logic 700 may wait until activation criteria 712 is satisfied before updating the active port list 505 (818). In the example logic 800 shown in FIG. 8, the activation logic 700 may update a pending activation list (820) that tracks activated ports for the current port selection round. Upon conclusion of the current port selection round and the start of the subsequent selection round, the activation logic 700 may update the active port list 505 to indicate the combination of data ports identified as active in the active status list 560 at the time of the start of the subsequent selection and data ports identified in the pending activation list as having activated prior to the start of the subsequent port selection round as eligible data ports for the subsequent port selection round.

The methods, devices, and logic described above may be implemented in many different ways in many different combinations of hardware, software or both hardware and software. For example, all or parts of the system may include circuitry in a controller, a microprocessor, or an application specific integrated circuit (ASIC), or may be implemented with discrete logic or components, or a combination of other types of analog or digital circuitry, combined on a single integrated circuit or distributed among multiple integrated circuits. All or part of the logic described above may be implemented as instructions for execution by a processor, controller, or other processing device and may be stored in a tangible or non-transitory machine-readable or computer-readable medium such as flash memory, random access memory (RAM) or read only memory (ROM), erasable programmable read only memory (EPROM) or other machine-readable medium such as a compact disc read only memory (CDROM), or magnetic or optical disk. Thus, a product, such as a computer program product, may include a storage medium and computer readable instructions stored on the medium, which when executed in an endpoint, computer system, or other device, cause the device to perform operations according to any of the description above.

The processing capability of the system may be distributed among multiple system components, such as among multiple processors and memories, optionally including multiple distributed processing systems. Parameters, databases, and other data structures may be separately stored and managed, may be incorporated into a single memory or database, may be logically and physically organized in many different ways, and may implemented in many ways, including data structures such as linked lists, hash tables, or implicit storage mechanisms. Programs may be parts (e.g., subroutines) of a single program, separate programs, distributed across several memories and processors, or implemented in many different ways, such as in a library, such as a shared library (e.g., a dynamic link library (DLL)). The DLL, for example, may store code that performs any of the system processing described above. While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. A method comprising:
    assigning, at scheduling circuitry, data ports of a network device to logical port groups based on a port speed of the data ports;
    storing a listing of logical port group assignments for the data ports;
    obtaining a selection criterion from memory;
    obtaining, at the scheduling circuitry, selection credit values for the logical port groups, the selection credit values and the selection criterion determining a future selection from the logical port groups;
    determining, through a group determination process, a selected logical port group from among the logical port groups by determining which of the selection credit values meets the selection criterion; and
    after determining the selected logical port group:
        determining, through a port determination process separate from the group determination process, a selected data port within the selected logical port group;
        obtaining, from the listing of logical port group assignments, identifying information for the selected data port;
        allocating, at the scheduling circuitry, a processing time slot to the selected data port; and
        responsive to allocating the processing time slot, adjusting a selection credit value for the selected logical port group against consecutive selection.

2. The method of claim 1, further comprising:
    adjusting a selection credit value for a logical port group other than the selected logical port group toward subsequent selection.

3. The method of claim 1, further comprising:
    determining group weights for the logical port groups; and
    adjusting the selection credit values as a function of the group weights.

4. The method of claim 1, further comprising:
    determining group weights for the logical port groups other than the selected port group;
    determining an adjustment value for the selected logical port group as a function of the group weights; and
    adjusting a selection credit value for the selected logical port group by the adjustment value.

5. The method of claim 1, further comprising:
    determining a group weight for a logical port group other than the selected port group, determining an adjustment value for the logical port group other than the selected port group as a function of the group weight; and
    adjusting a selection credit value for the logical port group other than the selected port group by the adjustment value.

6. The method of claim 1, where determining the selected data port comprises:
enforcing a packet spacing requirement.

7. The method of claim 1, where determining the selected data port comprises:
identifying an active data port within the selected logical port group as an eligible port for the processing time slot; and
identifying an inactive data port within the selected logical port group as an ineligible port for the processing time slot.

8. A device comprising:
input data ports that receive packet data; and
memory configured to store a selection criterion;
scheduling circuitry configured to:
assign the input data ports to logical port groups based on a port speed of the input data ports;
store a listing of logical port group assignments for the data ports;
obtain, from the memory, the selection criterion;
obtain selection credit values for the logical port groups, the selection credit values and the selection criterion determining a future selection from the logical port groups;
determine, through a group determination process, a selected logical port group from among the logical port groups by determining which of the selection credit values meets the selection criterion; and
after determining the selected logical port group:
determine, through a port determination process separate from the group determination process, a selected input data port within the selected logical port group;
obtain, from the listing of logical port group assignments, identifying information for the selected data port;
allocate a processing time slot to the selected input data port; and
responsive to allocating the processing time slot, adjust a selection credit value for the selected logical port group against consecutive selection.

9. The device of claim 8, wherein the scheduling circuitry is further configured to:
determine group weights for the logical port groups; and
adjust a selection credit value as a function of the group weights.

10. A product comprising:
a computer readable device other than a transitory signal, the computer readable device storing instructions that, when executed by a processor, cause the processor to:
assign data ports of a network device to logical port groups based on a port speed of the data ports;
store a listing of logical port group assignments for the data ports;
obtain, from memory, a selection criterion;
obtain selection credit values for the logical port groups, the selection credit values and the selection criterion determining a future selection from the logical port groups;
determine, through a group determination process, a selected logical port group from among the logical port groups by determining which of the selection credit values meets the selection criterion; and
after determining the selected logical port group:
determine, through a port determination process separate from the group determination process, a selected data port within the selected logical port group; and
obtain, from the listing of logical port group assignments, identifying information for the selected data port;
allocate a processing time slot to the selected data port; and
responsive to allocating the processing time slot, adjusting a selection credit value for the selected logical port group against consecutive selection.

11. The product of claim 10, wherein the instructions further cause the processor to:
determine a group weight for the logical port groups; and
adjust a selection credit value as a function of the group weights.

12. The product of claim 10, where the instructions cause the processor to determine the selected data port by enforcing a packet spacing requirement.

13. The product of claim 10, where the instructions cause the processor to:
identify an active data port within the selected logical port group as an eligible port for the processing time slot; and
identify an inactive data port within the selected port logical group as an ineligible port for the processing time slot.

14. The device of claim 8, wherein the scheduling circuitry is configured to:
identify an active data port within the selected logical port group as an eligible port for the processing time slot; and
identify an inactive data port within the selected port logical group as an ineligible port for the processing time slot.

15. The method of claim 1, where storing a listing comprises storing a bit map, the bit map configured to identify a storage location for data for the selected port group.

16. The device of claim 8, where the port determination process comprises round robin selection.

17. The product of claim 10, where the port determination process comprises round robin selection.

* * * * *